(12) United States Patent
Kubota et al.

(10) Patent No.: US 7,043,346 B2
(45) Date of Patent: May 9, 2006

(54) PARKING ASSIST APPARATUS AND PARKING ASSIST METHOD FOR VEHICLE

(75) Inventors: Yuichi Kubota, Okazaki (JP); Hisashi Satonaka, Susono (JP); Tomohiko Endo, Toyota (JP); Akira Matsui, Toyota (JP); Hideyuki Iwakiri, Tajimi (JP); Toru Sugiyama, Toyota (JP); Seiji Kawakami, Susono (JP); Katsuhiko Iwazaki, Shizuoka-ken (JP); Hiroaki Kataoka, Susono (JP); Yuu Tanaka, Aichi-ken (JP); Yoshifumi Iwata, Anjo (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 106 days.

(21) Appl. No.: 10/828,330

(22) Filed: Apr. 21, 2004

(65) Prior Publication Data

US 2004/0257244 A1 Dec. 23, 2004

(30) Foreign Application Priority Data

Apr. 28, 2003 (JP) .............................. 2003-123202

(51) Int. Cl.
*G06F 19/00* (2006.01)
*B60Q 1/48* (2006.01)

(52) U.S. Cl. ........................ 701/28; 701/26; 701/300; 340/932.2

(58) Field of Classification Search ...................... None
See application file for complete search history.

(56) References Cited

U.S. PATENT DOCUMENTS

| 6,424,895 | B1 * | 7/2002 | Shimizu et al. ............... 701/41 |
| 6,704,653 | B1 * | 3/2004 | Kuriya et al. ............... 701/301 |
| 6,898,527 | B1 * | 5/2005 | Kimura et al. ............... 701/301 |
| 6,919,822 | B1 * | 7/2005 | Tanaka et al. ............ 340/932.2 |
| 6,929,082 | B1 * | 8/2005 | Kataoka et al. ............. 180/204 |
| 6,950,035 | B1 * | 9/2005 | Tanaka et al. ........... 340/932.2 |
| 2003/0078713 | A1 * | 4/2003 | Tanaka et al. ................ 701/41 |

FOREIGN PATENT DOCUMENTS

| JP | 09-139936 | * | 5/1997 |
| JP | 10-244890 | * | 9/1998 |
| JP | A 10-264839 | | 10/1998 |
| JP | A 11-208420 | | 8/1999 |

* cited by examiner

*Primary Examiner*—Michael J. Zanelli
(74) *Attorney, Agent, or Firm*—Oliff & Berridge, PLC (57) ABSTRACT

A parking assist apparatus includes a display unit that displays a target parking frame to be superimposed on an actual image around a vehicle with its position adjustable by a user, a position determining unit that determines a target parking position corresponding to the position of the target parking frame displayed on the actual image, and a parking assist control unit that controls to guide the vehicle to the target parking position on a target path. The parking assist apparatus further includes a feature determining unit that determines a feature on the actual image through an image recognition, and a path correction unit that automatically corrects the target path such that a correlation between the target parking position upon start of a parking assist control and the feature is maintained during execution of the parking assist control.

19 Claims, 7 Drawing Sheets

ADJUSTMENT

FIG. 7

PARKING ASSIST APPARATUS AND PARKING ASSIST METHOD FOR VEHICLE

INCORPORATION BY REFERENCE

The disclosure of Japanese Patent Application No. 2003-123202 filed on Apr. 28, 2003 including the specification, drawings and abstract is incorporated herein by reference in its entirety.

BACKGROUND OF THE INVENTION

1. Field of the Invention

The invention relates to a parking assist apparatus and a parking assist method for a vehicle for guiding the vehicle to a target parking position set by a user along a target path.

2. Description of the Related Art

JP-A-11-208420 discloses a parking assist apparatus that superimposes on a target parking frame adjustable by a user (the image of the vehicle that has been automatically parked) with an actual image of the view around the vehicle displayed on a display monitor. The art disclosed in this publication allows the user to set the target parking position of the vehicle such that the intention of the user is reflected, for example, to draw the vehicle to be close to the right side or left side of the parking frame. Unlike the apparatus having the system that automatically determines the target parking position based on the detection results of sensors or the image recognition results, the disclosed apparatus is capable of preventing the vehicle from being automatically guided to the parking target position against the intention of the user.

JP-A-10-264839 also discloses a parking assist system that automatically guides a vehicle to a target parking position. This parking assist system estimates a current vehicle position based on each wheel speed detected by the respective vehicle wheel speed sensors and a yaw rate detected by a yaw rate sensor. When it is determined that the current vehicle position deviates from the target path, each steering angle of the wheel is corrected in accordance with the amount of the deviation from the target path so as to correct the deviation.

In a generally employed parking assist apparatus as aforementioned, the current vehicle position monitored under the parking assist control is an estimated value based on such information as detection results of the vehicle wheel speed sensor, yaw rate sensor and the like. Assuming that there is a disturbance on the road surface or the abnormality in the system (failure in the yaw rate sensor, for example), the apparatus may recognize the current vehicle position as being on the target path, as it cannot detect the error that actually occurs between the estimated current vehicle position and the actual vehicle position. In this case, the parking assist control is continued until such error is detected. As a result, the vehicle is guided to the position different from the target parking position that has been originally set by the user.

SUMMARY OF THE INVENTION

It is an object of the invention to provide a parking assist apparatus that reliably prevents the vehicle from being guided to a position different from the target parking position set by a user, which is caused by an error in the estimation of the current vehicle position.

According to a first aspect of the invention, a parking assist apparatus is provided with a display unit that displays a target parking frame to be superimposed on an actual image around a vehicle, a position of the target parking frame being adjustable by a user, a position determining unit that determines a target parking position corresponding to the position of the target parking frame displayed on the actual image, a parking assist control unit that controls to guide the vehicle to the target parking position on a target path, a feature determining unit that determines a feature on the actual image through an image recognition, and a path correction unit that automatically corrects the target path such that a correlation between the target parking position upon start of a parking assist control and the feature is maintained during execution of the parking assist control.

In the first aspect of the invention, the user sets the target parking position by adjusting the position of the target parking frame on the actual image displayed on the monitor. The vehicle is guided to the target parking position corresponding to the position of the target parking frame on the target path. In the invention, a feature of the actual image as the absolute reference is determined by the image recognition upon start of the parking assist control (including setting of the target parking position). The target path is automatically corrected such that the correlation between the target parking position and the feature of the actual image upon start of the parking assist control is maintained. Even if the error occurs in the estimation of the current vehicle position, that is, the correlation between the target parking position and the feature changes, the target path can be automatically corrected. As a result, the vehicle can be reliably guided to the target parking position that has been originally set by the user upon start of the parking assist control. The correlation between the target parking position and the feature includes both positional relationship and directional relationship. The "time upon start of the parking assist control" includes the "time when the parking assist control is resumed", for example, the time when the parking assist control is resumed after adjusting the position of the target parking frame under the parking assist control.

In the first aspect of the invention, the feature determining unit may determine a portion that is image recognizable and displayed on the actual image around the target parking frame as the feature.

In the first aspect of the invention, the feature determining unit may determine a white line of a parking frame as the feature.

In the first aspect of the invention, the position of the target parking frame may be adjustable in a direction parallel to the white line of the parking frame.

In the first aspect of the invention, the feature determining unit may determine one of a road shoulder and a car stop around the parking frame as the feature.

In the first aspect of the invention, an auxiliary switch that adjusts the position of the target parking frame displayed on a screen of the display unit in a longitudinal direction may further be provided.

In the first aspect of the invention, the screen of the display unit is a touch panel, and the auxiliary switch is displayed to be superimposed on the screen and operated by the user such that the position of the target parking frame may be moved.

In the first aspect of the invention, a detecting unit that detects a deviation of the vehicle from the target path may further be provided.

In the first aspect of the invention, the detecting unit may detect a deviation of the vehicle from the target path by comparing the relative positions the target parking frame during execution of the parking assist control and the feature on the actual image with a reference correlation.

In the first aspect of the invention, the parking assist control unit may automatically change the position of the target parking frame displayed on the screen of the display unit when the detecting unit detects the deviation of the vehicle from the target path.

In the first aspect of the invention, the parking assist control unit may stop the parking assist control when the detecting unit detects the deviation of the vehicle from the target path.

In the first aspect of the invention, the parking assist control unit may update the target path and a target steering angle corresponding to a newly determined target parking frame and to resume the parking assist control in accordance with the updated target path when the detecting unit detects the deviation of the vehicle from the target path.

In the first aspect of the invention, the parking assist control unit may stop the parking assist control when it fails to obtain the updated target path upon detection of the deviation of the vehicle from the target path.

In the first aspect of the invention, the detecting unit may detect the deviation of the vehicle from the target path when it is determined that there is a difference between the relative and the absolute moving vectors by comparing a relative moving vector of the vehicle with respect to the feature on the actual image during execution of the parking assist control with an absolute moving vector of the vehicle during execution of the parking assist control.

In the first aspect of the invention, the parking assist control unit may update the target path and the target steering angle according to the difference between the relative and the absolute moving vectors.

In the first aspect of the invention, the moving vector may be estimated by calculating a change amount of a moving distance and a direction of the vehicle during execution of the parking assist control based on at least one of output signals from a vehicle speed sensor, a steering angle sensor, and a yaw rate sensor.

In the first aspect of the invention, the moving vector may be estimated at a predetermined running distance of the vehicle.

According to a second aspect of the invention, a parking assist apparatus is provided with display means for displaying a target parking frame to be superimposed on an actual image around a vehicle, a position of the target parking frame being adjustable by a user, position determining means for determining a target parking position corresponding to the position of the target parking frame displayed on the actual image, parking assist control means for controlling to guide the vehicle to the target parking position on a target path, feature determining means for determining a feature on the actual image through an image recognition, and path correction means for automatically correcting the target path such that a correlation between the target parking position upon start of a parking assist control and the feature is maintained during execution of the parking assist control.

According to a third aspect of the invention, a parking assist method includes the steps of a first step of displaying a target parking frame to be superimposed on an actual image around a vehicle, a position of the target parking frame being adjustable by a user, a second step of determining a target parking position corresponding to the position of the target parking frame displayed on the actual image, a third step of controlling to guide the vehicle to the target parking frame on a target path, a fourth step of determining a feature on the actual image through an image recognition, and a fifth step of automatically correcting the target path such that a correlation between the target parking position upon start of the parking assist control and the feature is maintained during execution of the parking assist control.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

A preferred embodiment of the invention will be described referring to the drawings.

Figure 1:
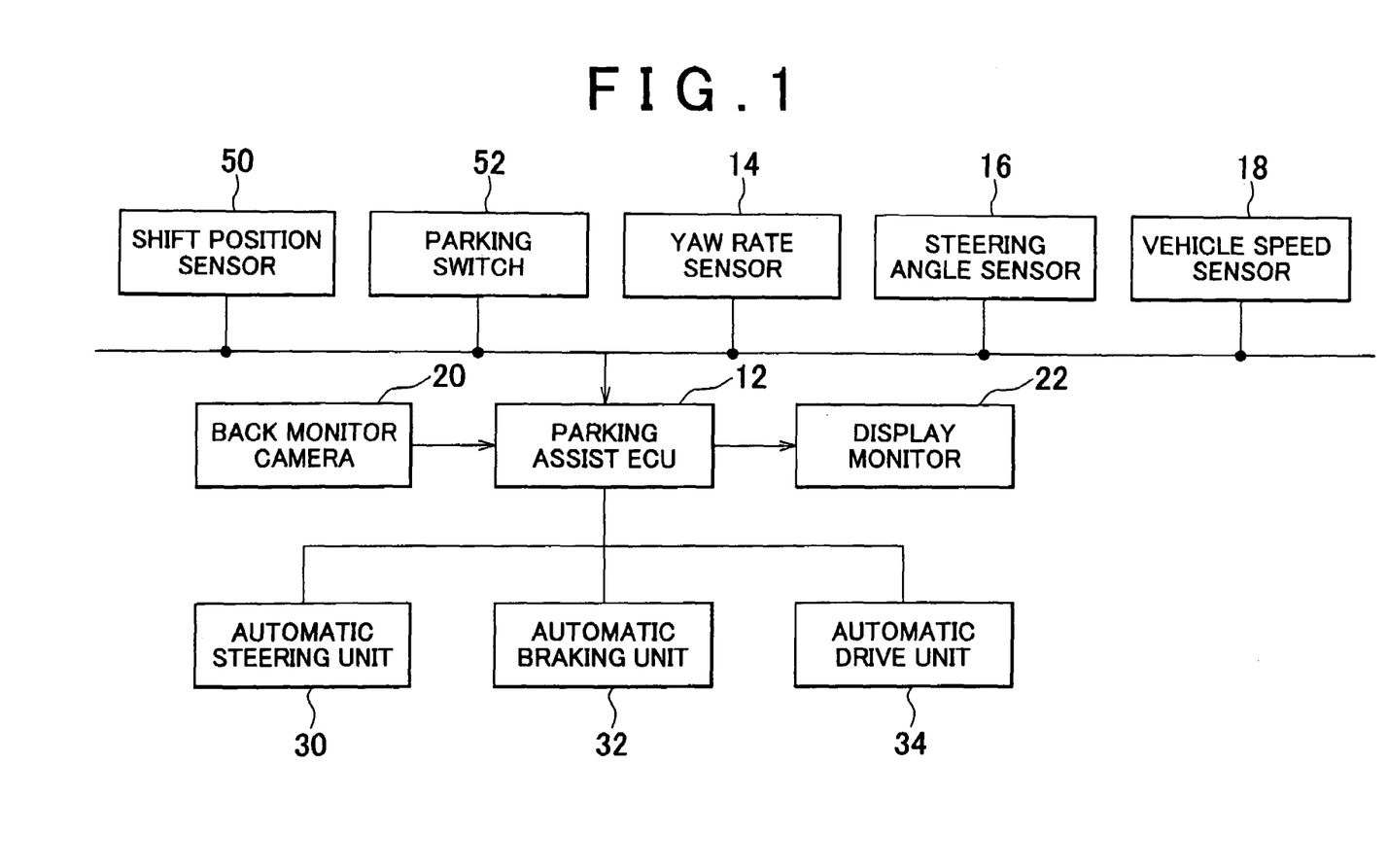
FIG. 1 is a view that shows a structure of a parking assist apparatus according to an embodiment of the invention.

FIG. 1 shows a structure of a parking assist apparatus as an embodiment of the invention. Referring to FIG. 1, the parking assist apparatus is mainly formed of an electronic control unit 12 (hereinafter referred to as a parking assist ECU 12). The parking assist ECU 12 includes a microcomputer with CPU, ROM and RAM which are connected one another via bus (not shown). The ROM contains programs to be executed by the CPU.

The parking assist ECU 12 is connected to a steering angle sensor 16 that detects a steering angle Ha of a steering wheel (not shown) and a vehicle speed sensor 18 that detects a vehicle speed V via appropriate bus, for example, high-speed communication bus and the like. The vehicle speed sensor 18 may be provided in the respective wheels and structured to generate a pulse signal at a cycle corresponding to the speed of the wheel. Each of output signals of the steering angle sensor 16 and the vehicle speed sensor 18 is supplied to the parking assist ECU 12.

The parking assist ECU 12 is connected to a shift position sensor 50 and a parking switch 52. The shift position sensor 50 generates an electric signal corresponding to an operating position of a shift lever so as to be supplied to the parking assist ECU 12. The parking switch 52 is provided in the vehicle interior so as to be operated by the user. The parking switch 52 is held OFF in a normal state, and set to ON by the user. The parking assist ECU 12 determines whether the shift lever is in an R range based on the output signal of the shift position sensor 50, and whether the user requires the parking assist control based on the output signal of the parking switch 52.

Figure 2:
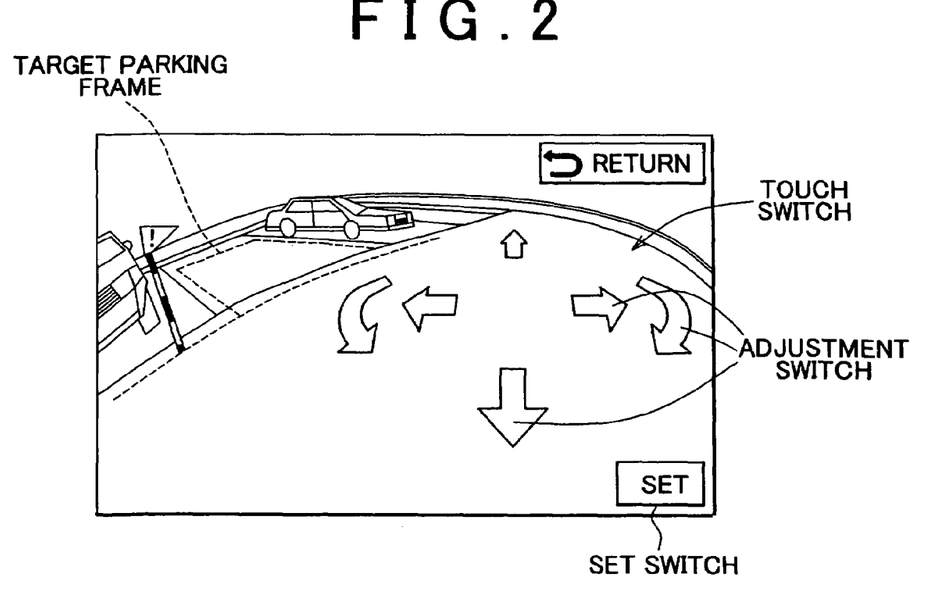
FIG. 2 shows an example of a touch panel for setting a target parking position on a display monitor.

The parking assist ECU 12 is connected to a back monitor camera 20 provided in the center of the rear portion of the vehicle, and a display monitor 22 provided in the interior of the vehicle. The back monitor camera 20 is a CCD camera that shoots a rear view of the vehicle in the range at a predetermined angle. The image signal of the back monitor camera 20 is supplied to the parking assist ECU 12. When it is determined that the shift lever is in the R range, and the parking switch 52 is set to ON, the parking assist ECU 12 displays the image shot by the back monitor camera 20 (actual image) on the display monitor 22. In this case, as shown in FIG. 2 that represents backing of the vehicle, a target parking frame is displayed so as to be superimposed on the actual image on the display monitor 22, and the touch switch for setting the target parking position is displayed as well.

The touch switch for setting the target parking position may include an adjustment switch for parallel movement of the target parking frame in the longitudinal and lateral directions, and for turning thereof, a parking selector switch (not shown) for selecting the required parking (parallel parking or backing), and a set switch for setting a position of the target parking frame (including the direction). The aforementioned touch switches are displayed on the display monitor 22 at appropriate timing and stage in the course of the parking assist control. The target parking frame may be formed to represent the actual parking frame as shown by a dashed line of FIG. 2, or the outer shape of the vehicle. The target parking frame may be formed such that its position and direction are visible to the user, and may have two variations of display, for example, backing and parallel parking.

The user operates the touch switch (adjustment switch) for setting the target parking position to change the position of the target parking frame on the display monitor 22 so as to match the target parking frame with the actual parking frame. The user operates the adjustment switch to move the target parking frame in the longitudinal and lateral directions in parallel or turn the target parking frame so as to match the target parking frame with the actual parking frame. The thus adjusted target parking frame is set as a final target parking frame through the operation of the set switch by the user (the user completes setting of the target parking position).

Figure 3:
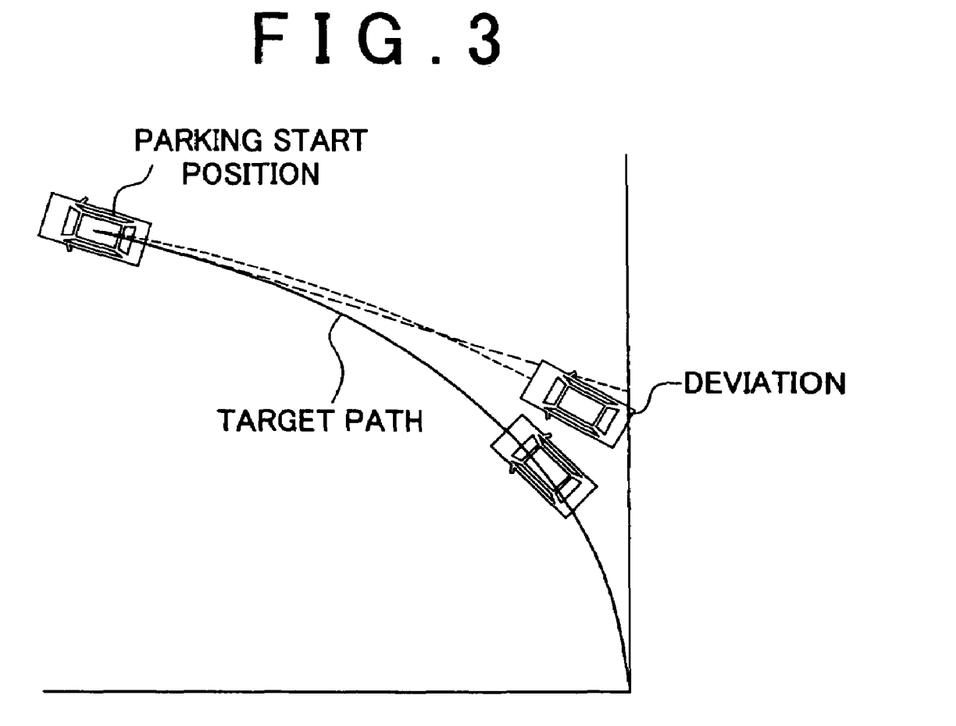
FIG. 3 is a view representing the state where the vehicle deviates from the target path.

When the user finalizes the target parking frame, the parking assist ECU 12 determines the target parking position corresponding to the position of the final target parking frame. Then the parking assist ECU 12 calculates a target path (see FIG. 3) based on the relationship of a parking start position with the target parking position, and further calculates a target steering angle of the wheel to be turned at each position on the target path. The position of the target parking frame always corresponds to the target parking position one by one. The target parking position determined upon setting of the target parking frame by the user will be referred to as an "intended parking target position" hereinafter.

The parking assist ECU 12 is connected to au automatic steering unit 30, an automatic braking unit 32, and an automatic drive unit 34 via appropriate bus, respectively. The parking assist ECU 12 controls those automatic steering unit 30, the automatic braking unit 32, and the automatic drive unit 34 such that the vehicle is guided on the target path. More specifically when a vehicle operator releases the depression force applied to a brake pedal, the creep force is generated. Upon start of backing of the vehicle, the parking assist ECU 12 controls the automatic steering unit 30 to automatically turn each wheel at a target steering angle at the respective vehicle positions on the target path. When the vehicle reaches the target parking position, the vehicle operator is required to stop the vehicle (or the vehicle is automatically stopped by the automatic braking unit 32). The parking assist control is, then, terminated.

The parking assist ECU 12 monitors whether the correlation between the target parking frame and the feature on the actual image has been maintained during execution of the aforementioned parking assist control. More specifically, the parking assist ECU 12 calculates a value representing the correlation between the target parking frame and the feature on the actual image when the user operates the set switch. The feature is visually recognizable to the user as the image superimposed on the actual image around the target parking frame. It is preferable that the feature be the white line of the actual parking frame corresponding to the target parking frame. However, other feature that is around the target parking frame such as a road shoulder or a car stop may be used so long as its image can be visually recognized by the user. The correlation between the target parking frame and the feature on the actual image includes a distance between a predetermined reference point of the target parking frame and the feature of the actual image (or a two-dimensional vector that connects the feature on the actual image and the predetermined reference point of the target parking frame). When the vehicle is backing, the correlation may include the angle defined by a predetermined line (outer shape line) of the target parking frame and a line (outer shape line, typically, white line) of the feature of the actual image. The correlation between the target parking frame set by the user and the feature of the actual image, which is calculated by the parking assist ECU 12 will be referred to as a "reference correlation" hereinafter. The parking assist ECU 12 stores the calculated reference correlation in a storage unit (for example, RAM of the parking assist ECU 12).

Coordinate value of a coordinate system on the display monitor 22 corresponds to the coordinate value of the actual coordinate system one by one by a predetermined conversion equation. The above-described reference correlation may be based on the coordinate system on the display monitor 22 or the actual coordinate system.

Under the parking assist control, the target steering angle is preliminarily determined at each of the vehicle positions on the target path. Therefore, the vehicle can be reliably guided to the intended target parking position so long as the vehicle position is estimated accurately during execution of the parking assist control. However, the vehicle position under the parking assist control is estimated based on the detection results of the vehicle speed sensor 18 and the steering angle sensor 16. In case of the error in the estimated vehicle position that deviates from the actual vehicle position owing to abnormality in the system (failure in the sensor itself) or an environmental disturbance (disturbance of the road), the vehicle may be guided to the target parking position that is different from the intended target parking position (see FIG. 3). Therefore, detection of such error in the estimated vehicle position, that is, deviation of the vehicle from the target path, is effective in view of improvement in reliability and accuracy of the parking assist control.

On the contrary, the parking assist ECU 12 of this embodiment calculates the correlation between the target parking frame and the feature on the actual image at a predetermined cycle under the parking assist control so as to compare the calculated correlation with the reference correlation. In this embodiment, the relative position of the target parking frame in reference with an absolute position of the feature recognized with the image is monitored during execution of the parking assist control. The position of the target parking frame on the display monitor 22 during execution of the parking assist control is determined through estimation based on the detection results of the vehicle sensor 18 and the steering angle sensor 16 in the same way as in the case of determining the vehicle position during execution of the parking assist control. According to the embodiment, the difference between the estimated vehicle position and the actual vehicle position caused by the system abnormality, that is, deviation of the vehicle from the target path, may be obtained by detecting the deviation of the correlation between the target parking frame and the feature on the actual image during execution of the parking assist control, that is, fluctuation of the relative positional relationship of the target parking frame with the absolute position of the feature.

In this embodiment, upon detection of the deviation of the correlation between the target parking frame and the feature on the actual image under the parking assist control from the reference correlation, the parking assist ECU 12 automatically changes the position of the target parking frame on the display monitor 22. The parking assist ECU 12 further updates the target path and the target steering angle each corresponding to the changed target parking frame position, and resumes the parking assist control in accordance with the updated target path. Accordingly even if the vehicle deviates from the target path owing to the system abnormality, such deviation is corrected to maintain the reference correlation. This makes it possible to guide the vehicle to the intended target parking position. In other words, this embodiment allows the user to have the vehicle guided to the pre-set target parking position reliably in spite of the system abnormality unless the user changes the target parking position during execution of the parking assist control.

The parking assist control is executed based on the target parking frame set by the user rather than based on the white line of the actual parking frame recognized by the image on the display. This may allow the user to park the vehicle at will, for example, to park the vehicle in the position closer to one side of the actual parking frame than the other or diagonally with respect to the center line of the actual parking frame depending on various circumstances, for example, for the purpose of avoiding an obstacle around the actual parking frame, opening/closing the door smoothly and the like.

Alternatively the relative vehicle moving vector with respect to the feature on the actual image during execution of the parking assist control is compared with the absolute vehicle moving vector during execution of the parking assist control. When a difference between those vectors is detected, the target path and the target steering angle are calculated again in accordance with the amount of the difference. This makes it possible to guide the vehicle to the intended target parking position. In this case, the moving vector of the feature on the actual image is calculated based on the image recognition, and the vehicle moving vector is estimated by calculating each change amount of the vehicle movement distance and the vehicle direction under the parking assist control based on output signals of the vehicle speed sensor 18 and the steering angle sensor 16. The aforementioned moving vectors may be calculated and estimated at every moving distance of the vehicle, for example, 0.5 m so as to be compared with each other.

The parking assist apparatus may be structured such that the vehicle position under the parking assist control in reference to the parking start position is detected by recognizing the image, and estimated based on the amount of the vehicle movement under the parking assist control that can be derived from the output signals of the vehicle speed sensor 18 and the steering angle sensor 16. In the aforementioned structure, the detected vehicle position is compared with the estimated vehicle position. In the case where the detected vehicle position is different from the estimated one, it can be determined that the vehicle deviates from the target path. In the above case, the target path and the target steering angle are calculated again in accordance with the difference, based on which the vehicle is reliably guided to the intended target parking position.

The apparatus may be structured to interrupt the parking assist control without calculating the target path and the target steering angle again upon detection of the deviation of the vehicle from the target path. It may also be structured to interrupt the parking assist control if the appropriate target path cannot be derived from the calculation upon detection of the deviation of the vehicle from the target path.

Figure 4:
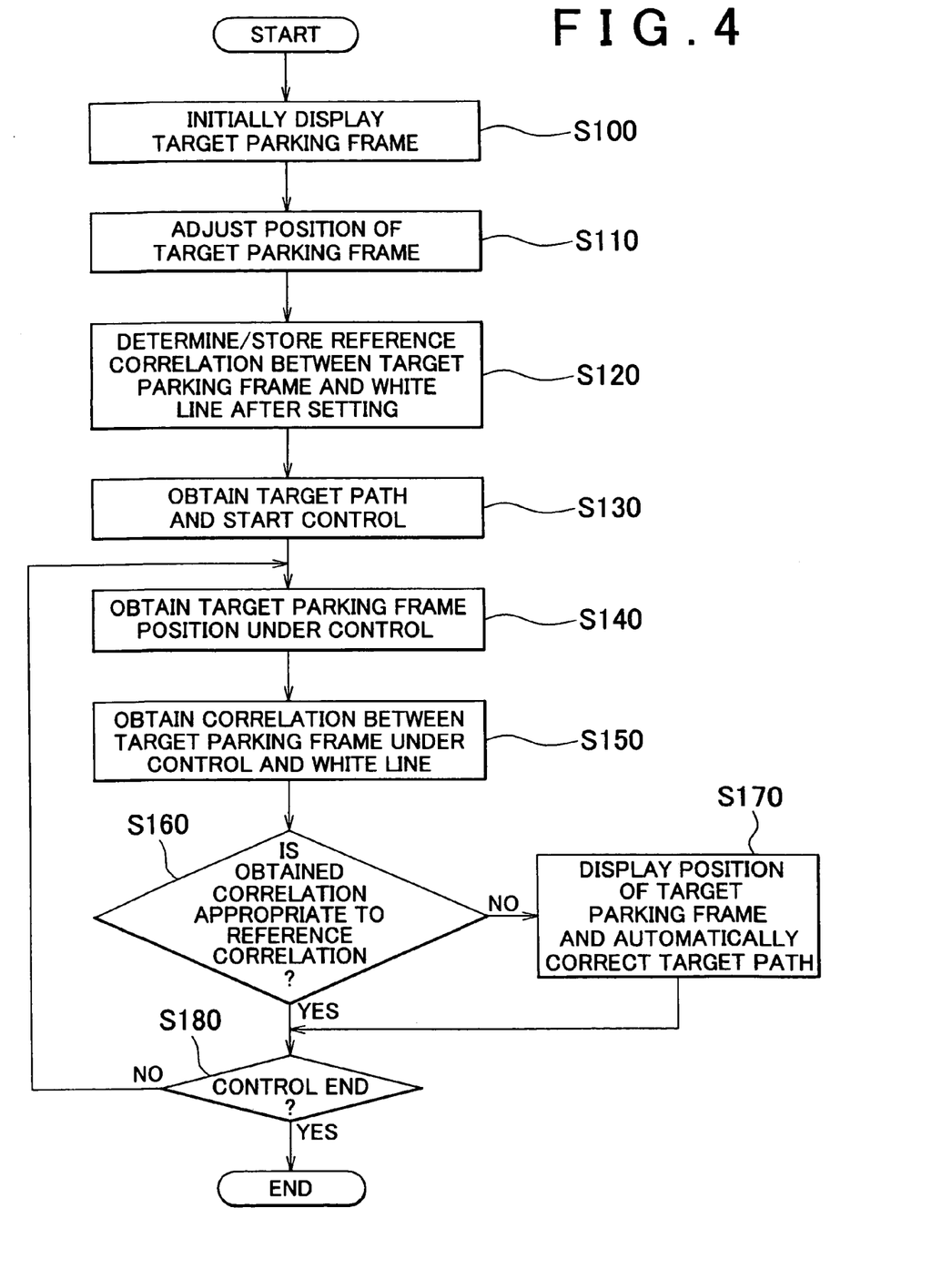
FIG. 4 is a flowchart of a control routine executed by a parking assist ECU according to the embodiment.

A control routine executed to detect the deviation of the vehicle from the target path, and to correct such deviation will be described referring to FIG. 4. FIG. 4 is a flowchart of the control routine executed by the parking assist ECU 12 according to this embodiment. This routine starts when the shift lever is selected to the R range and the parking switch 52 is set to ON.

Referring to the flowchart of FIG. 4, first in step S100, the image shot by the back monitor camera 20 is displayed on the display monitor 22, and the target parking frame is superimposed on the displayed image. The initial position of the target parking frame to be displayed on the display monitor 22 may be determined through the estimation based on the running state of the vehicle until it reaches the parking start position. Alternatively the initial position of the target parking frame may be set by the user who directly touches the touch screen of the display monitor 22. In this case, the initial position of the target parking frame may be determined based on the result of recognizing the white line of the displayed image around the touched position.

Then in step S110, the position of the displayed target parking frame is changed in accordance with the user's operation of the touch switch except the set switch, which is continuously executed until the user operates the set switch. When the set switch is operated without operation of the touch switch by the user, the process proceeds to step S120 without executing step S110. In step S110, the target parking frame is moved as the user operates the aforementioned adjustment switch.

In step S120, the white line around the target parking frame upon operation of the set switch is searched, and the correlation between the target parking frame and the feature on the actual image (white line) is determined and stored as the reference correlation. In this case, the reference correlation may be expressed as the distance between a predetermined reference point of the target parking frame (for example, a top or an intersection of the target parking frame) and a predetermined point of the white line. In the case where the vehicle is backing into the garage, the reference correlation may further include the angle defined by the direction of the target parking frame and the direction of the actual parking frame (white line).

The process proceeds to step S130 where the target parking position is set based on the target parking frame set in step S120, and the target path is calculated for guiding the vehicle from the current vehicle position, that is, the parking start position to the target parking position. In step S130, the target steering angle of the wheel to be steered at the respective positions of the vehicle on the target path is also calculated. Upon completion of step S130, the pre-process for executing the parking assist control ends. After executing step S130, the vehicle starts backing, and the parking assist control starts to execute the routine from steps S140 to S170 until the vehicle reaches the target parking position (determined in step S180). The process from steps S140 to S170 may be executed at every vehicle moving distance of 0.5 m, for example.

In step S140, the position of the target parking frame (position after the movement) on the display monitor 22 is determined based on the correlation between the vehicle position estimated in the previous routine (parking start position in the initial cycle of the routine) and the vehicle position estimated in the current routine. The vehicle position may be estimated by calculating the moving distance of the vehicle and the amount of change in the direction of the vehicle within the moving distance. In this case, the vehicle moving distance is calculated by time integrating the output signal (vehicle wheel speed pulse) of the vehicle speed sensor 18. The change amount of the direction of the vehicle may be calculated by integrating the road curvature (corresponding to an inverse number of the turning radius of the vehicle and determined based on the steering angle detected by the steering angle sensor 16) with the moving distance (the integral section corresponds to the moving distance of the vehicle, for example, 0.5 m). The change amount of the vehicle direction may be obtained by multiplying a short moving distance (0.01 m) by the road curvature obtained at every short distance (0.01 m), and the resultant multiplied value is further summed until it corresponds to the moving distance of 0.5 m. The relationship between the road curvature and the steering angle may be formed into a map based on the preliminarily obtained correlation data by the vehicle, and then stored in the ROM of the parking assist ECU 12.

In step S150, the position of the target parking frame on the display monitor 22 is updated, and the white line on the actual image around the target parking frame position is searched so as to calculate the correlation between a predetermined reference point of the target parking frame (the same reference point as in step S120) and the feature on the actual image (the same feature as in step S120).

In step S160, it is determined whether the correlation calculated in step S150 is in a predetermined range with respect to the reference correlation calculated in step S120. For example, it may be determined whether an absolute value of a difference between the distance from the reference point to the feature calculated in step S150 and such distance in the reference correlation is smaller than a predetermined threshold value.

If YES is obtained in step S160, it is determined that the reference correlation has been maintained (no deviation of the vehicle from the target path), and the process returns to step S140. Meanwhile if NO is obtained in step S160, it is determined that the reference correlation is not longer maintained (deviation of the vehicle from the target path) by a certain cause (system abnormality). The process then proceeds to step S170.

In step S170, the target parking frame position on the display monitor 22 is corrected in accordance with the degree of deviation of the correlation calculated in step S150 from the reference correlation. The target path and the target steering angle are further calculated in accordance with the corrected target parking frame position in step S170. As a result, the vehicle is controlled based on the updated target path and the target steering angle upon completion of step S150. The correlation between the reference point of the corrected target parking frame and the feature of the actual image matches the reference correlation. It is to be noted that the target parking position corresponding to the corrected target parking frame is the same as the target parking position (intended target parking position) determined in step S130. Upon completion of step S170, the process returns to step S140.

In the aforementioned embodiment, the correlation between the target parking frame under the parking assist control and the feature on the actual image is monitored in relation with the reference correlation. Detection of the difference between those correlations makes it possible to detect the deviation of the vehicle from the target path owing to the system abnormality and the like. When the deviation of the vehicle from the target path is detected, the target path and the target steering angle are updated so as to maintain the reference correlation. This makes it possible to reliably guide the vehicle to the intended target parking position, that is, the target parking position determined in step S130.

Figure 5:
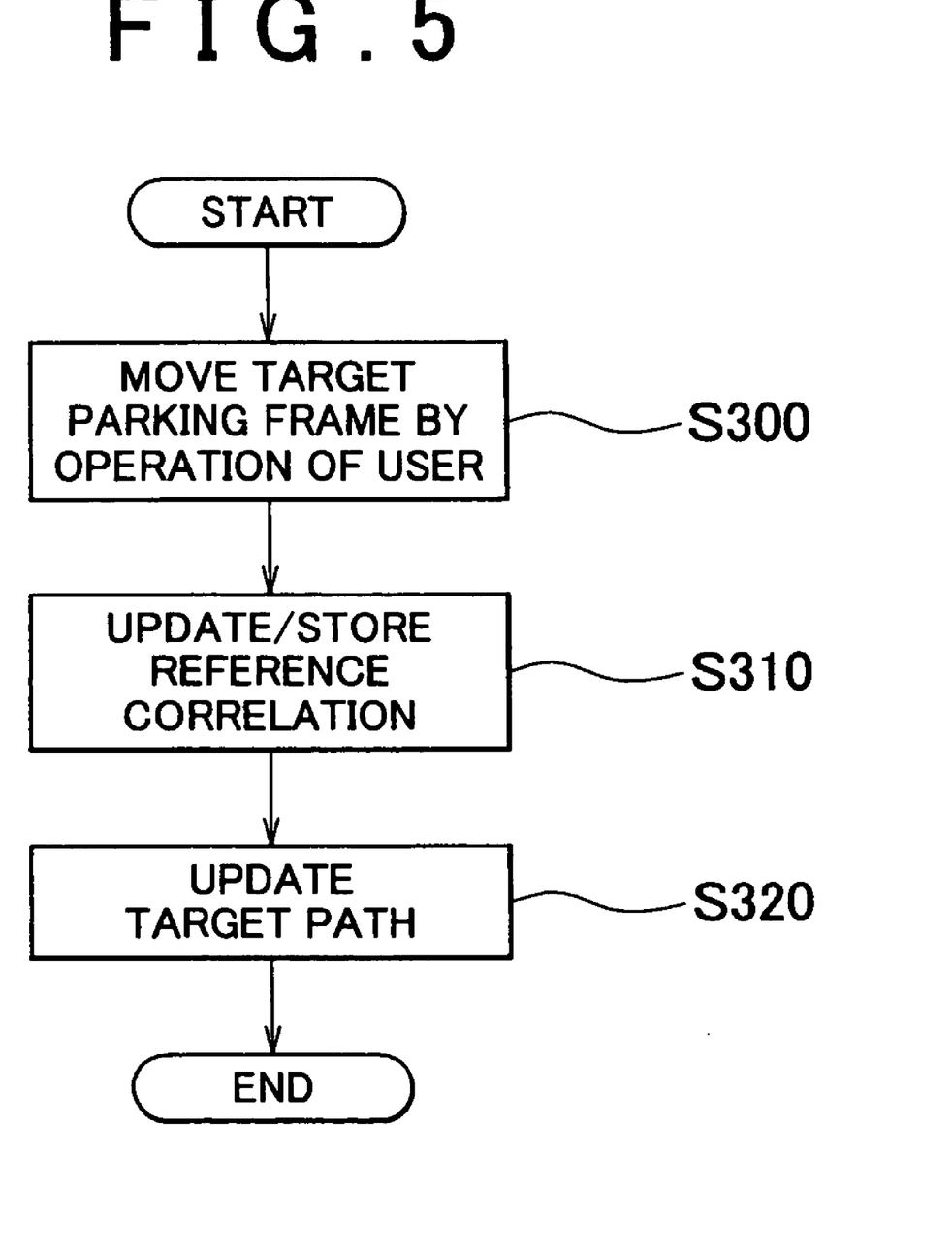
FIG. 5 is a flowchart of a control routine executed by the parking assist ECU according to the embodiment when the target parking frame is changed by the user under the parking assist control.

Referring to FIG. 5, the process to be executed when the target parking frame is changed by the user under the parking assist control will be described hereinafter. FIG. 5 is a flowchart of a control routine to be executed by the parking assist ECU 12 of the embodiment. This routine is executed as an interrupt routine when the target parking frame is changed by the user during execution of the process from steps S140 to S170 of the flowchart in FIG. 4.

When the user operates the adjustment switch under the parking assist control, in step S300, the position of the displayed target parking frame is changed in accordance with the operation of the adjustment switch until the set switch is operated again.

Then the correlation between the predetermined reference point of the target parking frame (the same reference point as in step S120) and the feature on the actual image (the same feature as in step S120) upon operation of the set switch is calculated in step S310. In step S310, the calculated correlation is updated and stored as the updated reference correlation.

In step S320, the target parking position is further updated based on the set target parking frame in step S310. Then the target path for guiding the vehicle from the current vehicle position to the updated target parking position is calculated as well as the target steering angle of the wheel to be turned at the respective vehicle positions on the target path. Upon completion of step S320, the interrupt routine is terminated, and execution of the process in step S140 and subsequent steps is resumed, that is, the parking assist control is resumed. Accordingly the determination in step S160 uses the updated reference correlation that has been calculated in step S310.

As the vehicle moves backward, the relationship between the target parking frame on the display monitor 22 and the actual parking frame becomes further clarified. Accordingly, the user may find that the target frame position fails to exactly match the initially intended one in the course of the parking assist control. According to the embodiment, as the target parking frame can be reset by the user during execution of the parking assist control, the vehicle can be reliably guided to the target parking position that matches the initially intended position.

The adjustment switch suitable for re-adjusting the target parking frame under the parking assist control, that is, re-adjustment of the target parking frame to be performed by the user during the process in step S300 will be described referring to FIGS. 6 and 7.

Figure 6:
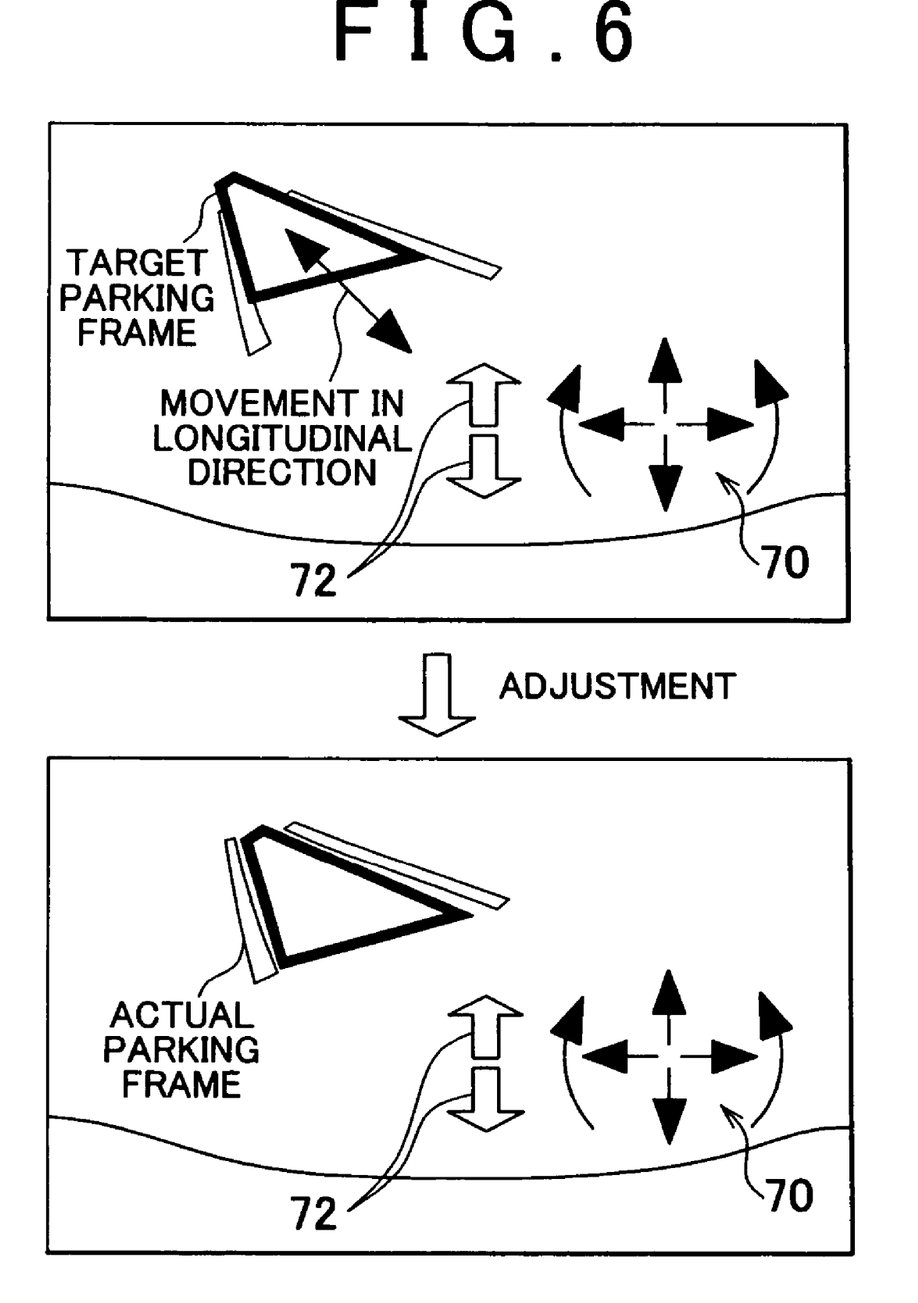
FIG. 6 shows a function of an adjustment switch of the embodiment.

As shown in FIG. 6, the adjustment switch of the embodiment includes a normal switch 70 that realizes the normal movement of the target parking frame in the longitudinal and lateral directions as well as turning, and a sub-switch 72 that realizes the parallel movement of the target parking frame along the white line of the actual parking frame. When the sub-switch 72 is operated, the target parking frame moves in the longitudinal direction along the white line of the actual parking frame as shown by arrow (moving direction) in FIG. 6. In the case where the target parking frame directionally matches the actual parking frame, but fails to match the position in the longitudinal direction of the actual parking frame, the sub-switch 72 allows correction of the position of the target parking frame in the longitudinal direction easily.

The adjustment switch according to this embodiment may be displayed on the display monitor 22 during execution of the parking assist control, that is, steps S140 to S170 of the control routine of the flowchart in FIG. 4. Alternatively the adjustment switch may be displayed on the display monitor 22 before start of the parking assist control, that is, at the stage where the target parking frame is set. In the case where the target parking frame position is determined based on the result of recognizing the white line around the peripheral area of the position touched by the user, it is difficult to accurately identify the position of ends of the white line in the longitudinal direction by the image recognition. This may cause the target parking frame to be deviated in the longitudinal direction from the actual parking frame (the direction of the target parking frame tends to match the actual parking frame). In the aforementioned structure, the sub-switch 72 is especially helpful to realize the movement of the target parking frame along the white line in the longitudinal direction.

Figure 7:
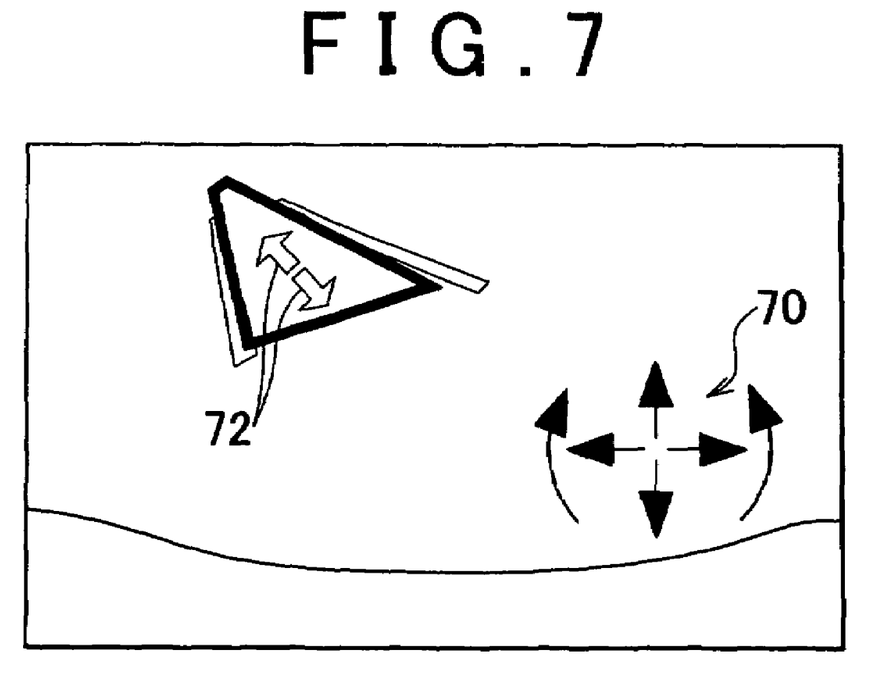
FIG. 7 shows a structure of the adjustment switch of the embodiment.

The sub-switch 72 may be displayed so as to be superimposed on the position around the target parking frame on the actual image as shown in FIG. 7. The sub-switch 72 may be formed as arrow with directions each corresponding to the actual movement direction. This makes it possible to allow the user to directly experience the function of the sub-switch 72.

In the aforementioned embodiment, the sub-switch 72 may function not only in the movement of the target parking frame in parallel with the longitudinal direction of the white line but also in the movement vertical to the longitudinal direction of the white line. The sub-switch 72 may realize the aforementioned various movements with respect to the longitudinal direction of the target parking frame rather than the longitudinal direction of the white line.

As has been described with respect to the preferred embodiments of the invention, it is to be understood that the invention is not limited to the aforementioned embodiment, and may be modified or embodied in various forms without departing the scope of the invention.

For example, the target parking frame position and the vehicle position on the display monitor 22 under execution of the parking assist control (movement vector of the vehicle) are estimated based on the output signals of the steering angle sensor 16 and the vehicle speed sensor 18. However, it is possible to estimate those positions based on the output signals of the yaw rate sensor and the vehicle speed sensor 18.

The aforementioned invention provides the advantageous effects as described below. Accordingly, the invention allows the vehicle to be reliably guided to the pre-set target parking position even if the error occurs in the estimation of the current vehicle position.

It should be noted that in the embodiment of the invention, the display monitor may be regarded as corresponding to a "display unit". Further, the parking assist ECU and the adjustment switch and the parking select switch and the set switch may be regarded as corresponding to a "position determining unit". Moreover, the parking assist ECU may be regarded as corresponding to a "parking assist control unit", a "feature determining unit", a "path correction unit", and a "detecting unit".

Further, the display monitor may be regarded as corresponding to a "display means". Furthermore, the parking assist ECU and the adjustment switch and the parking select switch and the set switch may be regarded as corresponding to a "position determining means". Moreover, the parking assist ECU may be regarded as corresponding to a "parking assist control means", a "feature determining means", and a "path correction means".

What is claimed is:

1. A parking assist apparatus comprising:
   a display unit that displays a target parking frame to be superimposed on an actual image around a vehicle, a position of the target parking frame being adjustable by a user;
   a position determining unit that determines a target parking position corresponding to the position of the target parking frame displayed on the actual image;
   a parking assist control unit that controls to guide the vehicle to the target parking position on a target path;
   a feature determining unit that determines a feature on the actual image through an image recognition; and
   a path correction unit that automatically corrects the target path such that a correlation between the target parking position upon start of a parking assist control and the feature is maintained during execution of the parking assist control.

2. The parking assist apparatus according to claim 1, wherein the feature determining unit determines a portion that is image recognizable and displayed on the actual image around the target parking frame as the feature.

3. The parking assist apparatus according to claim 2, wherein the feature determining unit determines a white line of a parking frame as the feature.

4. The parking assist apparatus according to claim 3, wherein the position of the target parking frame is adjustable in a direction parallel to the white line of the parking frame.

5. The parking assist apparatus according to claim 2, wherein the feature determining unit determines one of a road shoulder and a car stop around the parking frame as the feature.

6. The parking assist apparatus according to claim 1, further comprising an auxiliary switch that adjusts the position of the target parking frame displayed on a screen of the display unit in a longitudinal direction.

7. The parking assist apparatus according to claim 6, wherein the screen of the display unit is a touch panel, and the auxiliary switch is displayed to be superimposed on the screen and operated by the user to move the position of the target parking frame.

8. The parking assist apparatus according to claim 1, further comprising a detecting unit that detects a deviation of the vehicle from the target path.

9. The parking assist apparatus according to claim 8, wherein the detecting unit detects a deviation of the vehicle from the target path by comparing the relative positions the target parking frame during execution of the parking assist control and the feature on the actual image with a reference correlation.

10. The parking assist apparatus according to claim 9, wherein the parking assist control unit automatically changes the position of the target parking frame displayed on the screen of the display unit when the detecting unit detects the deviation of the vehicle from the target path.

11. The parking assist apparatus according to claim 9, wherein the parking assist control unit stops the parking assist control when the detecting unit detects the deviation of the vehicle from the target path.

12. The parking assist apparatus according to claim 9, wherein the parking assist control unit updates the target path and a target steering angle corresponding to a newly determined target parking frame and resumes the parking assist control in accordance with the updated target path when the detecting unit detects the deviation of the vehicle from the target path.

13. The parking assist apparatus according to claim 12, wherein the parking assist control unit stops the parking assist control when it fails to obtain the updated target path upon detection of the deviation of the vehicle from the target path.

14. The parking assist apparatus according to claim 8, wherein the detecting unit compares a relative moving vector of the vehicle with respect to the feature on the actual image during execution of the parking assist control with an absolute moving vector of the vehicle during execution of the parking assist control, and detects the deviation of the vehicle from the target path when it is determined that there is a difference between the relative and the absolute moving vectors.

15. The parking assist apparatus according to claim 14, wherein the parking assist control unit updates the target path and a target steering angle according to the difference between the relative and the absolute moving vectors.

16. The parking assist apparatus according to claim 14, wherein the relative moving vector is estimated by calculating a change amount of a moving distance and a direction of the vehicle during execution of the parking assist control based on at least one of output signals from a vehicle speed sensor, a steering angle sensor, and a yaw rate sensor.

17. The parking assist apparatus according to claim 16, wherein the moving vectors are estimated at a predetermined running distance of the vehicle.

18. A parking assist apparatus comprising:

display means for displaying a target parking frame to be superimposed on an actual image around a vehicle, a position of the target parking frame being adjustable by a user;

position determining means for determining a target parking position corresponding to the position of the target parking frame displayed on the actual image;

parking assist control means for controlling to guide the vehicle to the target parking position on a target path;

feature determining means for determining a feature on the actual image through an image recognition; and path correction means for automatically correcting the target path such that a correlation between the target parking position upon start of a parking assist control and the feature is maintained during execution of the parking assist control.

19. A parking assist method comprising:

a first step of displaying a target parking frame to be superimposed on an actual image around a vehicle, a position of the target parking frame being adjustable by a user;

a second step of determining a target parking position corresponding to the position of the target parking frame displayed on the actual image;

a third step of controlling to guide the vehicle to the target parking frame on a target path;

a fourth step of determining a feature on the actual image through an image recognition; and a fifth step of automatically correcting the target path such that a correlation between the target parking position upon start of the parking assist control and the feature is maintained during execution of the parking assist control.

* * * * *